(12) United States Patent
Nishikawa et al.

(10) Patent No.: US 6,909,563 B2
(45) Date of Patent: Jun. 21, 2005

(54) MASTER CARRIER FOR MAGNETIC TRANSFER

(75) Inventors: Masakazu Nishikawa, Kanagawa-ken (JP); Tadashi Yasunaga, Kanagawa-ken (JP); Kazuhiro Niitsuma, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 444 days.

(21) Appl. No.: 10/142,938

(22) Filed: May 13, 2002

(65) Prior Publication Data

US 2003/0063403 A1 Apr. 3, 2003

(30) Foreign Application Priority Data

| May 11, 2001 | (JP) | ............................. | 2001/141604 |
| Jun. 21, 2001 | (JP) | ............................. | 2001/188257 |
| Jul. 6, 2001 | (JP) | ............................. | 2001/206454 |
| Jul. 10, 2001 | (JP) | ............................. | 2001/209317 |
| Sep. 28, 2001 | (JP) | ............................. | 2001/302233 |

(51) Int. Cl.$^7$ .................................................. G11B 5/86
(52) U.S. Cl. ........................... 360/16; 360/15; 360/17
(58) Field of Search ............... 360/15–17; 428/694 SG, 428/694 TR

(56) References Cited

U.S. PATENT DOCUMENTS

6,347,016 B1    2/2002   Ishida et al.

FOREIGN PATENT DOCUMENTS

| JP | 63-183623 | | 7/1988 |
| JP | 10-40544 | | 2/1998 |
| JP | 10-269566 | | 10/1998 |
| JP | 11-025455 | * | 1/1999 |
| JP | 11-117800 | | 4/1999 |

* cited by examiner

*Primary Examiner*—David Hudspeth
*Assistant Examiner*—Natalia Figueroa
(74) *Attorney, Agent, or Firm*—Sughrue Mion, PLLC

(57) ABSTRACT

A master carrier for magnetic transfer is equipped with a substrate having a land/groove pattern. The land/groove pattern is formed from a magnetic material and corresponds to information that is transferred to a magnetic recording disk. Each land in the land/groove pattern has four round corners whose radius is from 1% through 47% of the width of a data track on the disk.

4 Claims, 7 Drawing Sheets

FIG.1A
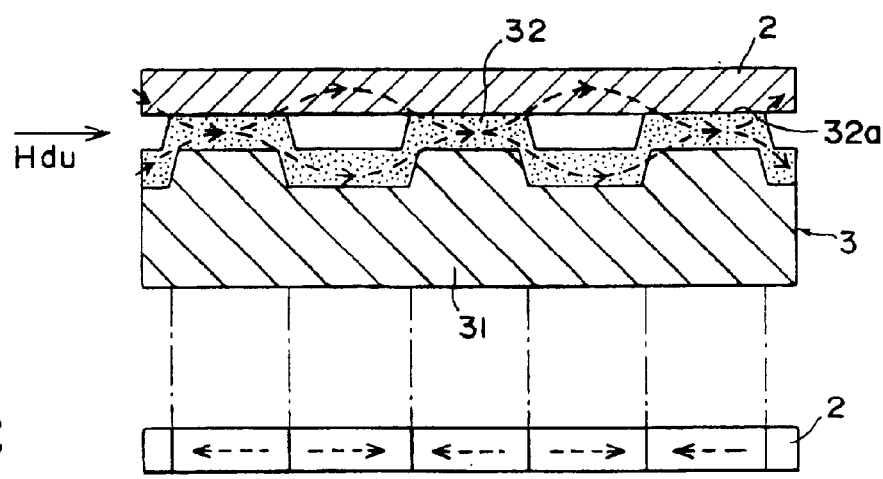
FIG.1B
FIG.1C

MASTER CARRIER FOR MAGNETIC TRANSFER

BACKGROUND OF THE INVENTION

1. Field of the Invention

The present invention relates to a master carrier for magnetic transfer carrying information that is transferred magnetically to a slave medium.

2. Description of the Related Art

In a magnetic transfer method, the surface of the substrate of a master carrier, coated with a magnetic material having a "land/groove" pattern that corresponds to information to be transferred, is brought into intimate contact with the surface of a slave medium having a magnetic recording portion. In this state, a transfer field is applied, and a magnetization pattern corresponding to information (for example, a servo signal) carried by the master carrier is transferred and recorded on the magnetic recording portion of the slave medium. Such a magnetic transfer method is disclosed, for example, in Japanese Unexamined Patent Publication Nos. 63(1988)-183623, 10(1998)-40544, and 10(1998)-269566.

The master carrier that is used for magnetic transfer is constructed of a silicon substrate, a glass substrate, or the like. The substrate has a land/groove pattern formed with a magnetic material by photolithography, sputtering, etching, etc.

It is also possible to generate the aforementioned master carrier by utilizing the lithography being used for semiconductor device fabrication or the stamper generation technique being used to generate an optical disk stamper.

To enhance the quality of transfer in the aforementioned magnetic transfer method, it is extremely important to bring the master carrier and the slave medium into direct contact with each other without a gap. If the contact between the two is poor, regions where magnetic transfer is not performed will occur. If magnetic transfer is not performed, missing signals occur in the magnetic information transferred to the slave medium and therefore the signal quality is reduced. In the case where a signal recorded is a servo signal, the tracking function cannot be sufficiently obtained, and consequently, there is a problem that reliability will be reduced.

In addition, in the magnetic transfer method disclosed in Japanese Unexamined Patent Publication No. 11 (1999)-117800, a magnetic recording medium is magnetized in advance in one direction. Thereafter, a master carrier with a soft magnetic layer is brought into direct contact with the magnetic recording medium, and a transfer field is applied in the opposite direction. In this way, more satisfactory transfer is made possible.

In the aforementioned master carrier, incidentally, it has been found that in the case where the land/groove pattern on the substrate corresponding to transfer information is formed from a magnetic material, the shape of the top of each land in the land/groove pattern has influence on a transfer characteristic.

As indicated in experiments to be described later, a plurality of different master carriers were generated, magnetic transfer was performed on a slave medium by employing the master carriers, and the quality of transferred signals was confirmed. As a result, it has been found that there are cases where depending on the generating condition for the master carrier, the signal quality is inferior to the signal quality in the case of a conventional method in which signals are recorded directly on the slave medium by a magnetic head, etc.

After the confirmation of the shape of the land/groove pattern on the master carrier, it has been found that the flat shape of the corner of each land in the land/groove pattern has a great influence on signal quality. For example, in the case of slave disk medium, a land/groove pattern for information corresponding to a servo signal has a plurality of rectangular or square lands elongated in the direction of the track width (radial direction). In this case, it has been found that if each of the 4 corners is formed at right angles without being chamfered, it chips when the master carrier is repeatedly brought into direct contact with the slave medium. It has also been found that the chipped corner produces dust particles which will cause the quality degradation of transferred signals.

Judging from the fact mentioned above, it is necessary to chamber the corners of each land of the land/groove pattern. However, it has been found that in the case where the corner is chamfered into the shape of a circular arc, the magnitude of the radius of the rounded corner has influence on the quality of transferred signals. That is, master carriers with a different rounded corner were generated and various experiments were made with respect to the radius of the rounded corner having influence on signal quality. As a result, it has been found that if the radius R of the rounded corner is increased, the rounded corner causes recording loss to occur in a transfer field applied when magnetic transfer is performed with the master carrier and the slave medium held in direct contact with each other. Because of this, the magnetization pattern formed on the slave medium becomes incomplete, and distinct signals cannot be recorded.

If the radius R of the rounded corner is reduced, recording loss is reduced and therefore the quality of transferred signals is enhanced. In this case, if magnetic transfer is performed a plurality of times by using the master carrier, signal quality is reduced. From this fact it has been found that (1) the corner of the land in the land/groove pattern chips, (2) the chipped pieces remain on the land/groove pattern, and (3) missing signals occur due to poor magnetic transfer.

Particularly, if the storage capacity of the slave medium is increased, the lands and grooves in the land/groove pattern on the master carrier become finer. Because of this, reliability must be enhanced while ensuring the compatibility between the conflicting requirements of the prevention of damage to the land corners in the land/groove pattern and the reduction in recording loss.

The present invention has been made in view of the problems mentioned above. According, it is an object of the present invention to provide a master carrier for magnetic transfer which is capable of enhancing the quality of transferred signals by a reduction in recording loss, also enhancing durability by the prevention of damage to a land/groove pattern formed on the master carrier, and preventing poor magnetic transfer, when performing magnetic transfer by applying a transfer field to the master carrier and the slave medium being held in direct contact with each other.

In addition, in the aforementioned magnetic transfer, dust particles have to be removed at a high level, because one or two flat master carrier are brought into direct contact with one side or both sides of a slave medium. If dust particles are present on the intimate contact portion, stable magnetic transfer cannot be performed and, in addition, there is a possibility that the master carrier or slave medium itself will be damaged.

In the magnetic transfer, relatively strong pressure is applied on the master carrier and the slave medium to perform whole-surface contact. Because of this, if magnetic transfer is repeated a large number of times, and the number of intimate contacts is increased, the soft magnetic layer formed on the substrate is separated in this step. The separated portion on the intimate contact portion reduces the quantity of transferred signals and degrades the durability of the master carrier.

Based on the result of an analysis performed on the separated portion of the soft magnetic layer, it has been found that the master carrier is considerably deformed during the intimate contact between the master carrier and the slave medium, and that separation of the soft magnetic layer occurs particularly at a place where the amount of deformation is great.

Furthermore, in the magnetic transfer, relatively strong pressure is applied on the master carrier and the slave medium, and in the whole-surface contact state, a transfer field is applied. Thereafter, the master carrier and the slave medium are mechanically separated from each other, or pressurized air is introduced through the outer circumferential portion between the master carrier and the slave medium to separate them from each other. Next, the master carrier and the slave medium are moved away from each other by vacuum suction. Because of this, if magnetic transfer is repeated a great number of times, the magnetic layer formed on the substrate will undergo wear, abrasion, separation, chipping, and edge deformation during the aforementioned steps. Consequently, there is a problem that (1) the shape of a pattern to be transferred will change and the quality of transferred signals will be reduced, (2) wear powder on the intimate contact portion will cause missing signals and reduce the quality of transferred signals, and (3) the durability of the master carrier will be degraded.

More specifically, the magnetic layer formed on the "lands" on the substrate of the master carrier becomes thinner due to wear and abrasion, or is separated from the substrate. In addition, the edge of the magnetic layer chips and the magnetic layer becomes narrower. Furthermore, dust particles adhere to the direct contact portion between the magnetic layer and the slave medium and cause scores to occur in the magnetic layer. Thereafter, poor contact occurs between the master carrier and the slave medium. Thus, it becomes difficult to perform stable magnetic transfer repeatedly.

The present invention has been made in view of the problems mentioned above. Accordingly, another object of the present invention is to provide a master carrier for magnetic transfer which is capable of preventing the wear, abrasion, separation, chipping, edge deformation, etc., of the magnetic layer, also enhancing durability, and preventing poor transfer, when performing magnetic transfer by applying a transfer field with the master carrier and the slave medium held in direct contact with each other.

In addition, in the magnetic transfer method mentioned above, the influence of a demagnetizing field on the magnetic recording medium is slight because of the application of a static field, as compared with a conventional servo write operation which is performed using a magnetic head. However, in the case where a transfer field is applied after the initial DC magnetization of a magnetic recording medium, as in a magnetic transfer method disclosed in Japanese Unexamined Patent Publication No. 11 (1999)-117800, there is a need to take the influence of a demagnetizing field on the magnetic layer of the magnetic recording medium into consideration. In recording media for longitudinal magnetization, there is a tendency for a magnetization transition region interval to shorten to meet the high-density requirement of storage capacity. In recording media in which the magnetization transition region interval has shorten, there are cases where because of the influence of a demagnetizing field during magnetic transfer, a shift will occur between a pattern on a master carrier for magnetic transfer and a magnetization pattern on a magnetic recording medium that is recorded according to the pattern of the master carrier. That is, there are cases where a desired magnetization pattern cannot be recorded accurately on a magnetic recording medium and therefore each magnetization transition region will be shifted from its original position.

The shift of the magnetization transition place, that is, the shift of a magnetization pattern from its original position will have a great influence on the accuracy of recording and reproduction that are performed through a magnetic recording medium. Particularly, in the case where information to be transferred is a servo signal, tracking performance is reduced and reliability is reduced.

The present invention has been made in view of the circumstances mentioned above. Accordingly, still another object of the present invention is to provide a master carrier for magnetic transfer that is capable of recording a desired magnetization pattern on a magnetic recording medium with a high degree of accuracy.

SUMMARY OF THE INVENTION

To achieve the objects of the present invention mentioned above, there is provided a first master carrier for magnetic transfer, comprising:

a substrate with a land/groove pattern, formed from a magnetic material, which corresponds to information to be transferred;

wherein each of approximately rectangular lands in the land/groove pattern has four round corners whose radius is from 1% through 47% (preferably 45% or less) of the width of a data track.

It is desirable that the aforementioned master carrier be constructed of a substrate with a land/groove pattern, formed by utilizing a stamper generation method in which metal is deposited on an original disk having a land/groove pattern corresponding to information by a metal film forming method (e.g., electrotyping). It is preferable that the substrate have nickel as its main component. It is also preferable that the magnetic material covering the surface of the land/groove pattern of the substrate be a soft magnetic material whose coercive field is 48 kA/m ($\approx$600 Oe) or less.

In accordance with the present invention, there is provided a magnetic transfer method comprising the steps of:

applying an initializing field to a master carrier comprising a substrate with a land/groove pattern, which is formed from a magnetic material and corresponds to information to be transferred, and in which each of approximately rectangular lands in the land/groove pattern has four round corners whose radius is from 1% through 47% of the width of a data track;

bringing the master carrier into direct contact with a slave medium having a magnetic recording portion; and transferring a magnetization pattern corresponding to the land/groove pattern to the slave medium by applying a transfer field to the master carrier being held in direct contact with the slave medium.

In the case of in-plane recording, the initial DC magnetization of the slave medium is performed in advance in the track direction parallel to the plane of the slave medium. In the case of perpendicular recording, the initial DC magnetization of the slave medium is performed in advance in the direction perpendicular to the plane of the slave medium. Next, the master carrier is brought into direct contact with the slave medium. In this state, a transfer field is applied in the opposite direction from the direction of the initial DC magnetization. In this manner, magnetic transfer is performed.

The initial magnetization of the slave medium is performed by magnetizing the entire slave medium in a predetermined direction with a magnetic field having a magnetic field intensity greater than the coercive field $H_{cs}$ of the slave medium. In addition, the application of the transfer field is performed by bringing the master carrier and the initialized slave medium into direct contact with each other, and then generating a magnetic field that has a predetermined magnetic field intensity distribution. In the predetermined magnetic field intensity distribution, the magnetic field intensity exceeding the maximum value of an optimum transfer field intensity range is not present; portions corresponding to the magnetic field intensity within the optimum transfer field intensity range are present; and in the entire region of the slave medium, the magnetic field intensity in the direction opposite to this is one-half or less of the coercive field $H_{cs}$ of the slave medium. The optimum transfer field intensity range is 0.6 to 1.3 times the coercive field $H_{cs}$ of the slave medium.

Note that the land/groove pattern on the aforementioned substrate may be a positive pattern or negative pattern with respect to a magnetization pattern transferred to the slave medium. That is, even if lands and grooves are reversed, the same magnetization pattern can be obtained if the initial magnetization and the direction of a transfer field in the magnetic transfer step are reversed between the case of a positive pattern and the case of a negative pattern.

The aforementioned magnetic transfer includes single-sided serial transfer and double-sided simultaneous transfer. The single-sided serial transfer is performed with a master carrier brought into direct contact with one side of a slave medium. The double-sided simultaneous transfer is performed with two master carriers brought into direct contact with both sides of a slave medium. In these cases, one or two master carriers are brought into direct contact with one side or both sides of a slave medium, one or two magnetic field generation means are arranged on one side or both sides, and a transfer field is applied. In the case of in-plane recording, the magnetic field generation means generates a magnetic field in the direction parallel to the slave medium plane. In the case of perpendicular recording, the magnetic field generation means generates a magnetic field in the direction perpendicular to the slave medium plane. In the case where the magnetic field is applied to a portion of the slave medium, magnetic transfer is performed on the entire surface by moving the slave medium and the master carrier being in direct contact with each other, or by moving the magnetic field. The magnetic field generation means uses an electromagnet device or permanent magnet device.

The slave medium to which magnetic transfer is performed by the master carrier of the present invention is brought into direct contact with the master carrier. As mentioned previously, the master carrier has a substrate with a land/groove pattern, formed from a magnetic material, which corresponds to information to be transferred. Each of approximately rectangular lands in the land/groove pattern has four round corners whose radius is from 1% through 47% of the width of a data track. The slave medium has a magnetic recording portion to which a magnetization patter, for a servo signal, corresponding to the land/groove pattern on the master carrier is transferred by application of a transfer field. As the slave medium, a disk-shaped magnetic recording medium, such as a hard disk, a flexible disk, etc., is preferred.

In accordance with the present invention, there is provide a second master carrier for magnetic transfer, comprising:
a substrate with a land/groove pattern; and
a soft magnetic layer formed on the land/groove pattern;
wherein the ratio (E1/E2) of a Young's modulus (E1) for the substrate to a Young's modulus (E2) for the soft magnetic layer is in the range of 0.3<(E1/E2)<1.3.

That is, the separation of the soft magnetic layer from the substrate due to deformation of the master carrier depends greatly on the relation of an elastic characteristic between the substrate (having the land/groove pattern) and the soft magnetic layer. With the Young's modulus of the substrate and the soft magnetic layer as parameters, various experiments have been made with respect to the separation of the soft magnetic layer, and the aforementioned ratio of the Young's modulus of the substrate to that of the soft magnetic layer has been derived.

In accordance with the present invention, there is provided a third master carrier for magnetic transfer, comprising:
a substrate with a land/groove pattern comprising lands and grooves; and
a patterned magnetic layer, formed on the substrate, for transferring information to a slave medium to which transfer is performed;
wherein the patterned magnetic layer comprises a magnetic land layer provided on each land of the substrate, a magnetic groove layer provided in each groove of the substrate, and a reinforcement portion provided between the magnetic land layer and the magnetic groove layer.

The generation of the third master carrier is made as follows. The lands, grooves, and reinforcement portions of the substrate are formed, for example, by multistage exposure and etching. After a magnetic layer is formed on the substrate, the surface is polished and an unnecessary magnetic layer formed on the reinforcement portion is removed. It is preferable that the formation of the magnetic layer be performed by vacuum film forming means, such as vacuum evaporation, sputtering, ion plating, etc.

In accordance with the present invention, there is provided a fourth master carrier for magnetic transfer, comprising:
a substrate with a land pattern, comprising a plurality of lands that have a magnetic layer on a surface of each land, and formed for transferring information to a magnetic layer of a magnetic recording medium;
wherein a correction based on a demagnetizing field is made on the land pattern so that a desired magnetization pattern is transferred to the magnetic layer of the magnetic recording medium.

That is, in the fourth master carrier, the width of each land in the aforementioned land pattern and the width between the lands are determined by correcting for a demagnetizing field component so that the width of each of the small regions in a magnetization pattern transferred to the magnetic recording medium by the aforementioned land pattern becomes a predetermined width. Therefore, the width of each land in the land pattern of the fourth master carrier of the present invention does not have a dimensional relation of 1:1 with respect to the width of a corresponding portion in the magnetization pattern transferred to the magnetic recording medium. The information to be transferred to the magnetic layer of the magnetic recording medium is a servo signal, a ROM-like signal, etc.

According to the master carrier of the present invention, each land in the aforementioned land/groove pattern has four round corners whose radius is from 1% through 47% of the width of a data track. Therefore, the master carrier of the present invention is capable of enhancing the quality of transferred signals by a reduction in recording loss, also enhancing durability by the prevention of damage to the pattern, and preventing poor transfer.

That is, since the radius of the round corner of the land is 47% or less of the width of the data track on a disk, an increase in the recording loss that a transfer field (applied to the master carrier and the slave medium in direct contact with each other) undergoes at the portion of the round corner can be prevented. Because of this, a distinct magnetization pattern is transferred and recorded and the quality of transferred signals becomes higher than the quality of signals written by an ordinary magnetic head. In addition, because the radius of the round corner of the land is 1% or greater of the data track width, the corner does not become excessively sharp. Therefore, even if the master carrier is repeatedly brought into direct contact with the slave medium, and magnetic transfer is performed a plurality of times, there is no possibility that the corner will brake and chip. In addition, missing signals due to poor transfer caused by broken particles do not occur, a reduction in the quality of transferred signals can be prevented, and the number of transfers can be increased by an enhancement in the durability of the master carrier.

According to the magnetic transfer method using the master carrier of the present invention, a magnetization pattern with high signal quality can be accurately transferred and the durability of the master carrier is high. The number of exchanges of the master carrier is reduced and therefore magnetic transfer can be efficiently performed.

In addition, the slave medium with a magnetization pattern transferred by the master carrier of the present invention has high signal quality and is inexpensive.

According to the second master carrier of the present invention, the ratio (E1/E2) of a Young's modulus (E1) for the substrate to a Young's modulus (E2) for the soft magnetic layer is in the range of $0.3<(E1/E2)<1.3$. In this case, even when the whole surface of the master carrier is repeatedly brought into direct contact with the whole surface of the slave medium, the separation of the soft magnetic layer from the substrate of the master carrier can be considerably reduced even at a greatly deformed portion of the master carrier. In addition, missing signals due to poor transfer caused by separated particles do not occur, a reduction in the quality of transferred signals can be prevented, and the number of transfers can be increased by an enhancement in the durability of the master carrier.

According to the third master carrier of the present invention, the patterned magnetic layer comprises a magnetic land layer provided on each land of the substrate, a magnetic groove layer provided in each groove of the substrate, and a reinforcement portion provided between the magnetic land layer and the magnetic groove layer. In this case, the magnetic land layer which is repeatedly brought into direct contact with the slave medium is reinforced at the circumferential edge portion by the reinforcement portion. Therefore, the wear, abrasion, separation, chipping, edge deformation, etc., of the magnetic layer can be prevented, the durability of the master carrier is enhanced, and the occurrence of poor transfer is prevented. Stable magnetic transfer can be repeatedly performed, whereby reliability can be enhanced.

Furthermore, the fourth master carrier of the present invention is equipped with a pattern having a shape determined in view of the influence of a demagnetizing field. In this case, a desired magnetization pattern can be recorded with a high degree of accuracy on a magnetic recording medium. Since a desired magnetization pattern is recorded with high fidelity on a magnetic recording medium, information based on the magnetization pattern can be accurately reproduced. Particularly, in the case where the information is a serve signal, accuracy of tracking is enhanced.

BRIEF DESCRIPTION OF THE DRAWINGS

The present invention will be described in further detail with reference to the accompanying drawings wherein:

FIGS. 1A to 1C are diagrams showing the steps of a magnetic transfer method which uses a master carrier constructed according to a first embodiment of the present invention;

DESCRIPTION OF THE PREFERRED EMBODIMENTS

Figure 2:
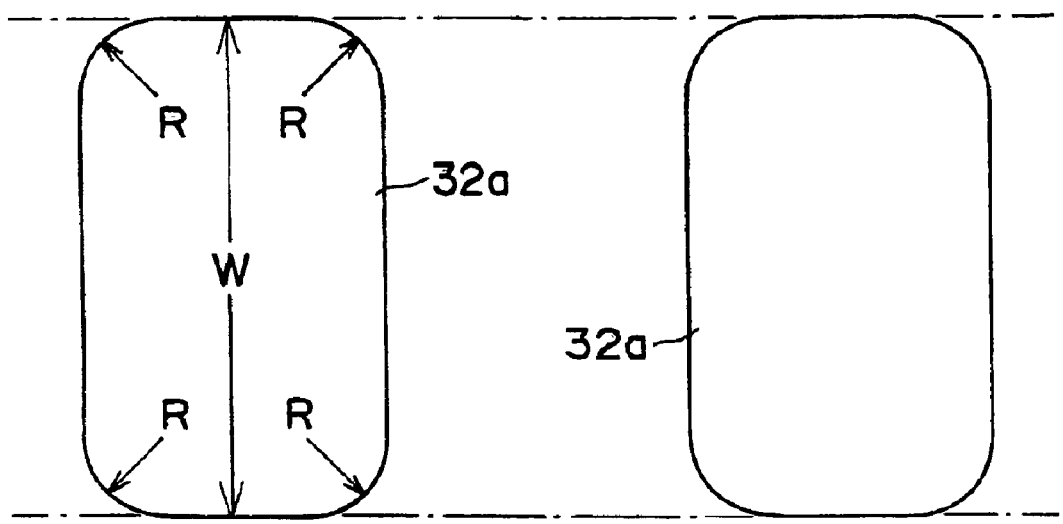
FIG. 2 is a plan view showing the land/groove pattern formed on the master carrier.

Referring to FIGS. 1 and 2, there is shown a magnetic transfer method using a master carrier constructed according to a first embodiment of the present invention. The magnetic transfer method uses in-plane recording, as shown in FIG. 1. Note in FIGS. 1 and 2 that the dimensions of each part are shown at a ratio differing from the actual dimensions.

The magnetic transfer method using in-plane recording will be outlined. As shown in FIG. 1A, an initializing field $H_{in}$ is first applied to a slave medium 2 in one direction along the direction of a data track on a disk to perform initial magnetization (DC demagnetization). Then, as shown in FIG. 1B, the slave surface (magnetic recording portion) of the slave medium 2, and the top surface of the land pattern 32a of an information carrying surface consisting of a soft magnetic layer 32 (magnetic material) coated on a microscope land/groove pattern on the substrate 31 of a master carrier 3, are brought physical contact with each other. In the state of the intimate contact, a transfer field $H_{du}$ is applied in the opposite direction from the direction of the initializing field $H_{in}$ to perform magnetic transfer. The transfer field $H_{du}$ is passed through the land pattern 32a of the soft magnetic layer 32, so that the magnetization of the land pattern 32a is not reversed and the magnetization in each groove is reversed. As shown in FIG. 1C, a magnetization pattern, which corresponds to a pattern formed by both the land pattern 32a of the soft magnetic layer 32 of the information carrying surface of the master carrier 3 and the grooves between the lands, is transferred to the slave surface (data track) of the slave medium 2.

The master carrier 3 is formed into the shape of a disk and has on one side of the disk an information carrying surface coated with a microscopic land/groove pattern, corresponding to a servo signal and formed from the soft magnetic layer 32. The surface opposite to the information carrying surface is held by intimate contact means (not shown) and is brought into direct contact with the slave medium 2. In the magnetic transfer, there are single-sided serial transfer shown in FIG. 1 and double-sided simultaneous transfer. The single-sided serial transfer is performed with the master carrier 3 brought into direct contact with one side of the slave medium 2. The double-sided simultaneous transfer is performed with two master carriers 3 brought into direct contact with both sides of the slave medium 2.

As shown in FIG. 2, each land in the land/groove pattern 32a is rectangular in shape, the corners being chambered into a circular arc. It is prescribed that the radius R of the circular arc of each corner is from 1% through 47% (preferably 45% or less) of the data track width W. In the case of a servo signal, the data track width W is on the order of 0.1 to 2 $\mu$m. Therefore, in the case of the data track width W being 0.1 $\mu$m the radius R becomes 1 to 47 nm. In practice, it is desirable that the radius R be in the range of 5 to 47 nm (preferably, 5 to 45 nm). If it is less than 5 nm, the corners will be easily damaged. If it exceeds 47 nm, recording loss will become greater. In the case that the data track width W is 2 $\mu$m, the radius R becomes 20 to 940 nm.

Although not shown, an actual servo signal has a land pattern shifted from the pitch between the data tracks by an amount equal to one-half the pitch. The radius R of each land in this land pattern is prescribed the same as the aforementioned.

Note that in the case where the land/groove pattern on the substrate 31 of the master carrier 3 is a negative land/groove pattern opposite the positive land/groove pattern shown in FIG. 1, a similar magnetization pattern can be transferred and recorded by applying the initializing field $H_{in}$ and the transfer field $H_{du}$ in a direction opposite to the aforementioned direction.

In the case where the substrate 31 consists of a ferromagnetic material such as nickel (Ni), magnetic transfer can be performed without coating the substrate 31 with the soft magnetic layer 32. However, satisfactory magnetic transfer can be performed by providing the soft magnetic layer 32 whose transfer characteristic is good. In the case where the substrate 31 consists of a nonmagnetic material, it is necessary to provide the soft magnetic layer 32.

It is preferable that the soft magnetic layer 32 be provided with a protective coat consisting of diamond-like carbon (DLC), etc. It may be provided with a lubricant layer. It is further preferable that the protective layer consist of a DLC coat of 5 to 30 nm and a lubricant layer. Furthermore, there may be provided an intimate-contact reinforcing layer, which consists of silicon (Si), etc., between the soft magnetic layer 32 and the protective coat. A lubricant improves durability degradation, such as the occurrence of scores due to friction, which occurs in correcting for a shift that occurs when the soft magnetic layer 32 and the slave medium 2 are brought into contact with each other.

The substrate 31 of the master carrier 3 uses nickel (Ni), silicon (Si), quartz, glass, aluminum, alloys, ceramics, synthetic resin, etc. The land/groove pattern on the substrate is formed by a stamper generation method, etc.

In the stamper generation method, a photoresist film is first coated on the smooth surface of a glass plate (or a quartz plate) by spinning the glass plate. Then, a laser light beam (or an electron beam) modulated according to a servo signal is irradiated while the glass plate is being rotated. On the entire photoresist film, a predetermined pattern, for example, a pattern extending in the radial direction from the center of rotation and corresponding to a servo signal, is exposed at the portions corresponding to the frames of data tracks. Thereafter, the photoresist film is developed to remove the exposed portions, and an original disk with a land/groove shape consisting of the photoresist film is obtained. Next, based on the land/groove pattern on the surface of the original disk, the surface is plated (or electroplated), and a nickel (Ni) substrate with a positive land/groove pattern is generated and separated from the original disk. This substrate, as it is, is employed as the master carrier, or the land/groove pattern on the substrate may be coated with a soft magnetic layer and a protective film and employed as the master carrier.

In addition, the aforementioned original disk is plated to generate a second original plate, and by using the second original disk, plating is performed, whereby a substrate with a negative land/groove pattern may be generated. Furthermore, by plating the second original disk or hardening a resin solution applied to the second original, a third original plate is generated, and the third original disk is plated, whereby a substrate with a positive land/groove pattern may be formed.

On the other hand, a photoresist pattern is formed on the glass plate; etching is performed to form grooves in the glass plate; the photoresist is removed to obtain an original disk; and thereafter, a substrate may be formed in the aforementioned manner.

The metal material for the substrate 31 can use Ni or a Ni alloy. The plating method for generating the metal substrate 31 can employ various metal-film forming methods such as electroless plating, electroplating, sputtering, ion plating, etc. It is preferable that the groove depth (or land height) in the land/groove pattern of the substrate 31 be in the range of 80 to 800 nm. The range of 100 to 600 nm is further preferable.

The formation of the soft magnetic layer 32 is performed by forming a thin layer of magnetic material with vacuum film forming means, such as vacuum evaporation, sputtering, ion plating, etc., a plating method, etc. The magnetic material of the soft magnetic layer 32 is able to employ cobalt (Co), alloys with Co (CoNi, CoNiZr, CoNbTaZr, etc.), iron (Fe), alloys with Fe (FeCo, FeCoNi, FeNiMo, FeAlSi, FeAl, FeTaN, etc.), Ni, and alloys with Ni (NiFe, etc.). Particularly, FeCo and FeCoNi are preferred. It is preferable that the thickness of the soft magnetic layer 32 be in the range of 50 to 500 nm. The range of 100 to 400 nm is further preferable.

The master carrier may be formed by generating a resin substrate using the aforementioned original plate, and then providing a soft magnetic layer on the substrate surface. The resin material of the resin substrate is able to use acrylic resin, such as polycarbonate, poly (methyl methacrylate), etc., vinyl chloride resin, such as poly(vinyl chloride), a vinyl chloride copolymer, etc., epoxy resin, amorphous polyolefin, polyester, etc. Polycarbonate is preferable because it has moisture resistance and dimension stability and is low in cost. In the case where there are burrs in molded products, they are removed by varnishing or polishing. In addition, the original disc may be provided with a spin coat or bar coat by using ultraviolet-ray hardened resin, electron-beam hardened resin, etc. It is preferable that the land height in the land/groove pattern of the resin substrate be in the range of 50 to 1000 nm. The range of 100 to 500 nm is further preferable.

The microscopic pattern on the surface of the resin substrate is coated with a soft magnetic layer to obtain the master carrier. The soft magnetic layer is formed by depositing a suitable magnetic material on the resin substrate by vacuum film forming means, such as vacuum evaporation, sputtering, ion plating, etc., a plating method, etc.

In the case of perpendicular recording, approximately the same master carrier 3 as that of the aforementioned in-plane recording is used. That is, a land/groove pattern is formed on the substrate 31, and the top surface of the land pattern 32 is formed from the soft magnetic layer (soft magnetic material) 32. Each land in the land pattern 32a is rectangular in shape, the corners being chambered into a circular arc. It is prescribed that the radius R of the circular arc of each corner is from 1% through 47% of the data track width W.

In the case of the aforementioned perpendicular recording, initial DC magnetization is performed so that the slave medium 2 is magnetized in one direction perpendicular to the slave medium plane. With the slave medium 2 and the master carrier 3 held in direct contact with each other, a transfer field is applied in the opposite direction from the direction of the initial magnetization direction to perform magnetic transfer. Since the transfer field is passed through the soft magnetic layer 32 of the land pattern 32a of the master carrier 3, the perpendicular magnetization of a portion corresponding to the land pattern 32 is reversed. In this way, a magnetization pattern corresponding to the land/groove pattern can be recorded on the slave medium 2.

The slave medium 2 uses a magnetic recording disk, which has a magnetic recording portion (magnetic layer) formed on one side or both sides, such as a hard disk, a high-density flexible disk, etc. The magnetic recording portion is constructed of a coat type magnetic recording layer or a thin metal film type magnetic recording layer. The magnetic material of the thin metal film type magnetic recording layer is able to employ cobalt (Co), alloys with Co (CoPtCr, CoCr, CoPtCrTa, CoPtCrNbTa, CoCrB, CoNi, etc.), iron (Fe), alloys with Fe (FeCo, FePt, FeCoNi, etc.), Ni, and alloys with Ni (NiFe, etc.). These magnetic materials are preferable, because they have a great flux density and also have magnetic anisotropy in the same direction as the direction of an applied magnetic field (track direction in the case of in-plane recording or perpendicular direction in the case of perpendicular recording) and therefore distinct transfer can be performed. It is preferable to provide a base layer of nonmagnetic base under the magnetic material (i.e., on the side of the substrate) to obtain the required magnetic anisotropy. It is necessary that the crystal structure and lattice constant of the base layer be matched with those of the magnetic layer. For this reason, the base layer employs Cr, CrTi, CoCr, CrTa, CrMo, NiAl, Ru, etc.

Note that before it is brought into direct contact with the master carrier 3, the slave medium 2 undergoes the process of removing the microscopic protrusions or dust particles on the surface by a grinding head, a polisher, etc., as occasion demands.

In the case of in-plane recording, the magnetic-field generation means, for applying an initializing field and a transfer field, is constructed of vertically spaced ring electromagnets that have a coil wound on a core having a gap which extends in the radial direction of the slave medium 2. With the vertically spaced ring electromagnets, a transfer field generated in the same direction is applied parallel to the data track direction. During application of a magnetic field, the magnetic field generation means applies a transfer field, while the contact body of the slave medium 2 and master carrier 3 is being rotated. The magnetic field generation means may be provided so that it is rotatable. The magnetic field generation means may be disposed only on one side. The magnetic field generation means may be constructed of a single permanent magnet arranged on one side or two permanent magnets arranged on both sides.

The magnetic field generation means in the case of perpendicular recording is constructed of electromagnets or permanent magnets of opposite polarities, which are disposed above and below a contact body consisting of the slave medium 2 and the master carrier 3. The magnetic field generation means generates a magnetic field in a perpendicular direction and applies it to the contact body. When the magnetic field generation means applies a magnetic field to a portion of the slave medium 2, magnetic transfer is performed on the entire surface by moving either the contact body or the magnetic field.

Now, with respect to modifications and comparative examples of the master carrier in the first embodiment, a description will be given of the results of experiments indicating that it is preferable that the radius R of the round corner of each land in the land pattern on the master carrier be in the aforementioned range.

<Generation of Master Carriers>

A photoresist (electron beam drawing resist) was coated on a glass plate with a flat surface by a spin coat method. An electron beam was irradiated thereon while the glass plate was rotated, thereby performing exposure thereof. Next, the photoresist was developed and the exposed portions were removed, to form an original disk. Then, a Ni substrate was produced by plating the original disk with Ni and peeling it off from the original disk. In the land/groove pattern of the Ni substrate, radial lines with a width of 0.3 $\mu$m, a line pitch of 2.5 $\mu$m, and a groove depth of 0.3 $\mu$m are arranged from the disk center up to a radial position of 20 to 40 mm, and the pitch between lines is 0.5 $\mu$m at the radially innermost position 20 mm away from the disk center.

On the Ni substrate, a FeCo30at. % soft magnetic layer (a composition is given in atomic percent) of thickness 200 nm was formed. The Ar sputter pressure was $1.5 \times 10^{-1}$ Pa (1.08 mTorr) and the applied electric power was 2.80 W/cm$^2$.

The data track width W and the radius R of the circular arc of the corner in the aforementioned pattern were modified. In a first modification, a master carrier with W=0.3 $\mu$m and R=5 nm (R/W=1.7%) was generated. In a second modification, a master carrier with W=0.3 $\mu$m and R=20 nm (R/W=6.7%) was generated. In a third modification, a master carrier with W=0.1 $\mu$m and R=45 nm (R/W=45%) was generated. In a first comparative example, a master carrier with W=0.3 $\mu$m and R=2 nm (R/W=0.67%) was generated. In a second comparative example, a master carrier with W=0.1 $\mu$m and R=48 nm (R/W=48%) was generated.

In the method of measuring the radius R of the round corner, the surfaces of the master carriers after generation were observed based on SEM, and the pattern shapes were observed. Based on the results of observation, the radius R of each round corner in each land pattern was calculated.

<Generation of a Slave Medium>

In a vacuum film forming device (Shibaura Mechatronics: S-50S Sputtering Apparatus), the pressure was reduced to 1.33×10⁻⁵ Pa (10⁻⁷ Torr) at room temperature. Then, argon (Ar) was introduced and the pressure was increased to 0.4 Pa (3×10⁻³ Torr) Under these conditions, a glass plate was heated to 200° C. and a 3.5" disk-shaped magnetic recording medium (hard disk) with a CrTi layer of thickness 60 nm, a CoCrPt layer of thickness 25 nm, a flux density Ms of 5.7 T (4500 Gauss), and a coercive field $H_{cs}$ of 199 kA/m (2500 Oe) was generated and used as the slave medium.

<Magnetic Transfer Test Method>

With the ring head electromagnets arranged so that at the surface of the slave medium 2 the peak magnetic field intensity became 398 KA/m (5000 Oe) equal to twice the coercive field $H_{cs}$ of the slave medium 2, initial DC magnetization was performed on the slave medium 2. After the initial DC magnetization, the slave medium 2 and a master carrier were brought into direct contact with each other, and the current through the ring head electromagnets was controlled so that the peak magnetic field intensity became 207 kA/m (2600 Oe) at the surface of the slave medium 2. A transfer field was applied in the opposite direction from the direction of the initial DC magnetization. In this way, magnetic transfer was performed. Note that the intimate contact between the master carrier and the slave medium was performed by clamping with aluminum plates through rubber plates.

<Method of Evaluating Signal Quality>

The signals transferred to the slave medium were evaluated by an electromagnetic transformation characteristic measuring apparatus (Kyodo Electronics: SS-60). A magneto resistive (MR) head was used which has a read gap of 0.19 μm, a read width of 2.0 μm, a recording head gap of 0.4 μm, and a recording track width of 2.6 μm. The read signal was separated into frequency components with a spectrum analyzer, and a difference (C/N) between the peak intensity C of the primary signal and neighboring medium noise N was measured. Due to large amounts of eccentricity occurring in the slave mediums when set in the apparatus, it was not possible to evaluate all of the signals across one whole rotation. Therefore, evaluations were performed locally, utilizing a lead gate function. In addition, for cases in which the track width was narrower than the read width of the head, the C/N value was corrected (standardized) for the track width. As a conventional method, signals were recorded and reproduced with the same MR head, and with a calculated C/N value as 0 dB, an evaluation was made by a relative value (ΔC/N). If the relative value (ΔC/N) becomes less than (greater in a negative direction than) −3.0 dB, the signal intensity becomes smaller and causes poor transfer. Therefore, in the case of −3.0 dB or greater it is evaluated as good (○), and in the case of less than −3.0 dB it is evaluated as poor (X). The results are listed in Table 1.

<Missing Signal and Intimate-Contact Evaluating Method>

Magnetic transfer was repeated 1000 times by using the same master carrier. Thereafter, a magnetic developing solution (Sigma High Chemical: SIG Marker Q) was diluted to ¹/₁₀ and dropped on the slave medium. The slave medium was dried and the quantity of shift of the developed signal end was evaluated. The number of missing signals present on the slave medium was randomly observed within a visual field of 100 at a 1:50 magnification ratio by a differential interference microscope. If the number of missing signals within the 100 visual field is 5 or less, it is evaluated as good (○). In the case of 6 to 9 missing signals, it is evaluated as fair (Δ). In the case of 10 or more missing signals, it is evaluated as poor (X). The results are indicated in Table 1.

TABLE 1

| | Corner radius R (nm) | Track width (μm) | R/W (%) | Signal quality (dB) | Number of missing signals |
|---|---|---|---|---|---|
| First modification | 5 | 0.3 | 1.7 | −0.2(○) | 4(○) |
| Second modification | 20 | 0.3 | 6.7 | +0.1(○) | 4(○) |
| Third modification | 45 | 0.1 | 45 | −1.6(○) | 3(○) |
| First comparative example | 2 | 0.3 | 0.67 | +0.5(○) | 43(X) |
| Second comparative example | 48 | 0.1 | 48 | −3.6(X) | 2(○) |

As can be seen from Table 1, in the first comparative example in which the corner radius R is 2 nm (R/W=0.67%), signal quality is good, but a great number of missing signals have occurred due to damage to the lands in the land pattern after magnetic transfer has been performed 1000 times. By contrast, in the first to the third modifications where the corner radius R is 5 to 45 nm (R/W=1.7 to 45%), signal quality is slightly inferior to the first comparative example. However, signal quality is in a good range, the number of missing signals is considerably reduced, and there is no damage to the corners of the lands. In the second comparative example where the corner radius R is further greater (48 nm), the problem of missing signals is considered practically negligible. However, an increase in recording loss has reduced signal quality and caused poor transfer. As a result, it is preferable that the corner radius R be in the range of 5 to 47 nm and the ratio R/W be in the range of 1 to 47%.

A further modification of the present invention is constructed so that in the master carrier 3 shown in FIG. 1, a Young's modulus ratio E1/E2 of a Young's modulus (E1) for the substrate 31 having a land/groove pattern to a Young's modulus (E2) for the soft magnetic layer 32 formed on the land/groove pattern is in the range of 0.3<(E1/E2)<1.3.

If the ratio E1/E2 of the Young's modulus ratio of the substrate 31 to that of the soft magnetic layer 32 of the master carrier 3 is in the aforementioned range, there is no possibility that the deformations of the substrate 31 and slave medium 2 will be shifted greatly from each other even at a greatly deformed portion of the master carrier 3, when the master carrier 3 and the slave medium 2 are repeatedly brought into direct contact by strong pressure during magnetic transfer. Therefore, separation of the soft magnetic layer 32 can be prevented, the occurrence of dust particles can be prevented, and the quality of transferred signals can be ensured. Furthermore, durability of the master carrier 3 is enhanced.

Now, a description will be given of modifications in which the ratio E1/E2 of the Young's modulus ratio of the substrate to that of the magnetic layer of the master carrier in the aforementioned modifications has been changed. In addition, a description will be given of the results of experiments indicating that it is preferable that the Young's modulus ratio be in the aforementioned range. The experiments were carried out in the same manner as the aforementioned modifications, and the number of missing signals was evaluated. The results are indicated in Table 2.

In the first through the third modifications, the substrate consists of Ni, the magnetic layer consists of a FeCo30at. % layer (a composition is given in atomic percent), the Young's modulus ratio E1/E2 is 1.02, and the evaluation of missing signals is good. The master carrier in a fourth modification is the same as that of the first modification, the material of the substrate is changed to a constantan, and the Young's modulus ratio E1/E2 is 1.25. The master carrier in a fifth modification is the same as that of the first modification, the material of the substrate is changed to tungsten carbide, and the Young's modulus ratio E1/E2 is 0.38. The master carrier in a sixth modification is the same as that of the first modification, the material of the substrate is changed to copper, and the Young's modulus ratio E1/E2 is 1.53. The master carrier in a seventh modification is the same as that of the first modification, the material of the substrate is changed to polycarbonate, and the Young's modulus ratio E1/E2 is 0.19. As indicated in Table 2, the evaluation of missing signals for the fourth and fifth embodiments whose Young's modulus ratio is within the aforementioned range is good. In the sixth and seventh embodiments whose Young's modulus ratio is slightly outside of the aforementioned range, the number of missing signals is increased and therefore the evaluation is fair.

TABLE 2

|  | Young's modulus ratio (e) | Number of missing signals |
| --- | --- | --- |
| Fourth modification | 1.25 | 3(○) |
| Fifth modification | 0.38 | 2(○) |
| Sixth modification | 1.53 | 6(Δ) |
| Sixth modification | 0.19 | 9(Δ) |

Figure 3:
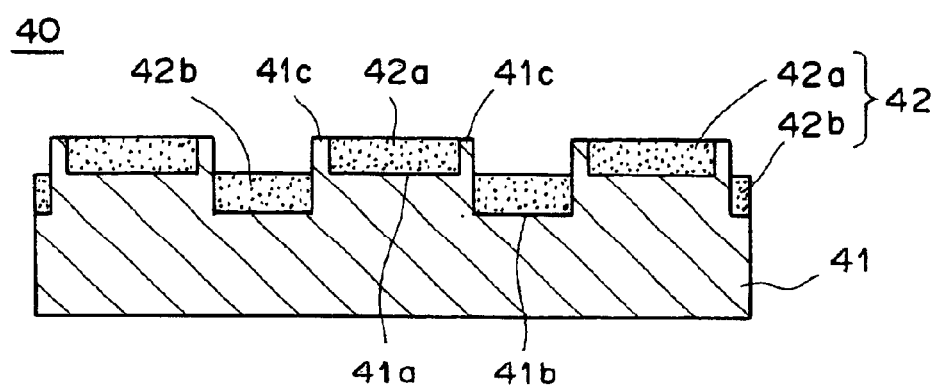
FIG. 3 is a sectional view showing the essential part of a master carrier constructed according to a second embodiment of the present invention.

A second embodiment of the present invention will hereinafter be described in detail. FIG. 3 schematically shows the essential part of a master carrier fabricated according to the second embodiment. FIG. 4 shows how the master carrier is generated.

Figure 5A:
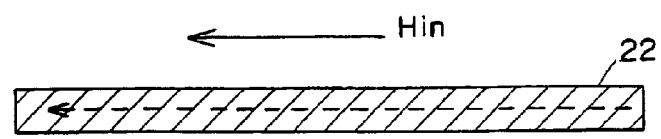
FIGS. 5A to 5C are diagrams showing basic steps for magnetic transfer.
Figure 5B:
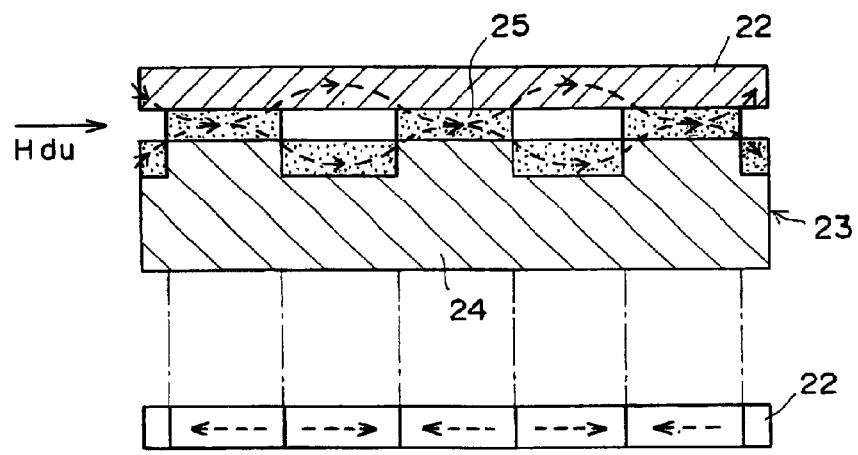
Figure 5C:
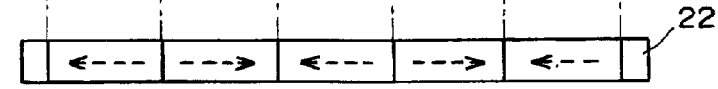

Now, the basic steps of magnetic transfer that is the subject of the present invention will be described with reference to FIG. 5. This example is in-plane recording. Initially, a slave medium 22 and a master carrier 23 are prepared. The slave medium 22 has a magnetic recording layer on which magnetic transfer is performed. As shown in FIG. 5B, the master carrier 23 is constructed of a substrate 24 whose microscopic land/groove pattern is coated with a magnetic layer 25, and has a land/groove pattern formed from the magnetic layer 25. Next, as shown in FIG. 5A, initial magnetization (DC demagnetization) is performed so that the magnetic slave medium 22 is magnetized in one direction along a data track direction by an initializing field $H_{in}$. Thereafter, as shown in FIG. 5B, the magnetic recording surface of the slave medium 22 and the land/groove pattern of the magnetic layer 25 of the master carrier 23 are brought into direct contact with each other, and a transfer field $H_{du}$ in the opposite direction from the direction of the initializing field $H_{in}$ is applied in the data track direction of the slave medium 22, whereby magnetic transfer is performed. The transfer field $H_{du}$ is passed through the land pattern of the magnetic layer 25. Although the magnetization in the land pattern is not reversed, the magnetization in each groove is reversed. As a result, as shown in FIG. 5C, a magnetization pattern corresponding to the land/groove pattern of the magnetic layer 25 of the master carrier 23 is transferred and recorded on the data tracks of the slave medium 22. Note that in the case of perpendicular recording, magnetic transfer can be performed on a slave medium by using approximately the same master carrier as that of the aforementioned in-plane recording.

As shown in FIG. 3, a master carrier 40 for magnetic transfer is equipped with a substrate 41, which has a microscopic land/groove pattern consisting of lands 41a, grooves 41b, and reinforcement portions 41c. The surface portion of the substrate 41 is provided with a magnetic layer 42 formed into the shape of a pattern corresponding to information to be transferred. That is, the magnetic layer 42 consists of magnetic land layers 42a provided in the lands 41a, and magnetic groove layers 42b provided in the grooves 41b. Between the magnetic land layer 42a and the magnetic groove layer 42b, the reinforcement portion 41c is erected in the land 41a of the substrate 41.

In the case of the second embodiment shown in FIG. 3, the reinforcement portions 41c are arranged on both sides of the land 41a of the substrate 41 and are formed into the shape of a narrow width protrusion so that they become coplanar with the land 41a. By the reinforcement portions 41c, the magnetic land layer 42a is buried in the groove region formed in the land 41a.

Figure 4A:
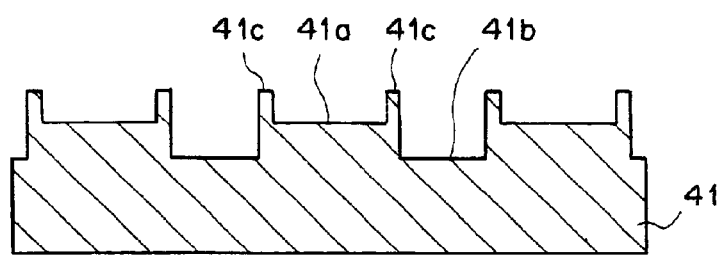
FIGS. 4A and 4B are sectional views showing how the master carrier is generated.

For the master carrier 40 mentioned above, the substrate 41 with a microscopic land/groove pattern consisting of lands 41a, grooves 41b, and reinforcement portions 41c is first generated as shown in FIG. 4A. The land/groove pattern with different depths can be formed, for example, by multistage exposure and etching. The substrate 41 can be generated by a master ring employing the land/groove pattern.

Figure 4B:
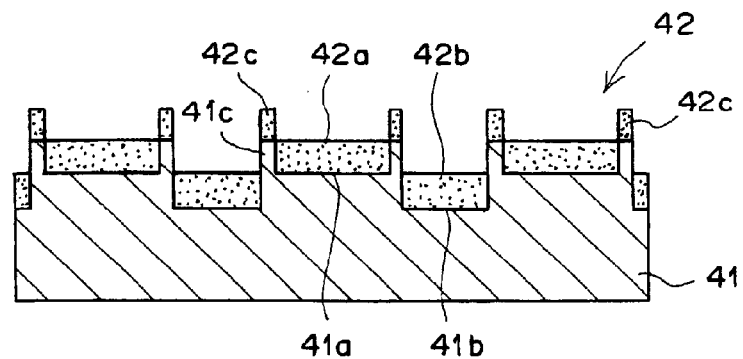

Next, as shown in FIG. 4B, the magnetic layer 42 is formed on the substrate 41 to a predetermined thickness with a soft magnetic material by vacuum film forming means such as vacuum evaporation, sputtering, ion plating, etc. In the magnetic layer 42, in addition to the magnetic land layer 42a on the land 41a and the magnetic groove layer 42b within the groove 41b, an unnecessary magnetic layer 42c is formed on the reinforcement portion 41c.

Thereafter, the surface of the substrate 41 with the magnetic layer 42 formed thereon is polished to remove the unnecessary magnetic layer 42c formed on the reinforcement portion 41c, and the magnetic land layer 42a is polished so that it becomes coplanar with the reinforcement portion 41c. In this way, the master carrier 40 is formed as shown in FIG. 3.

According to the second embodiment, the magnetic land layer 42a on the master carrier 40 is reinforced by the reinforcement portion 41c of the substrate 41 formed in the boundary portion between the magnetic land layer 42a and the magnetic groove layer 42b. This renders it possible to prevent wear, abrasion, separation, chipping, edge deformation, etc., even when the substrate 41 is repeatedly brought into direct contact with the slave medium 22 during magnetic transfer. The durability of the master carrier 40 is enhanced, so the long life is achieved. At the same time, the pattern has no deformation and stable magnetic transfer can be repeatedly performed. The occurrence of dust particles due to wear is also reduced and therefore the occurrence of poor transfer can be prevented.

Note that the height of the reinforcement portion 41c of the substrate 41 may be lower than the thickness of the magnetic land layer 42a.

The master carrier 40 of the present invention performs magnetic transfer in similar steps to those shown in FIG. 5. That is, the master carrier 40 is brought into direct contact with the slave medium 22 magnetized in one direction (track direction or perpendicular direction). In this intimate contact state, a transfer field is applied in approximately the opposite direction from the direction of the initializing field by a field applying device such as electromagnets, etc. In this manner, a magnetization pattern corresponding to the land/groove pattern (transfer information) of the master carrier 40 is transferred and recorded on the slave medium 22.

The substrate 41 of the master carrier 40 employs nickel, silicon, aluminum, alloys, etc. The land/groove pattern is formed by a stamper generation method, etc.

In the stamper generation method, a photoresist film is first coated on the smooth surface of a glass plate (or a quartz plate) by spinning the glass plate. Then, a laser light beam (or an electron beam) modulated according to a servo signal is irradiated while the glass plate is being rotated, and the pattern on the magnetic land layers 42a, for example, a pattern corresponding to a servo signal is exposed. Thereafter, the photoresist film is developed to remove the exposed portions, and the glass plate is etched to form groove regions in which the magnetic land layers 42a are buried. After the photoresist film is removed, a photoresist film is formed again in the aforementioned manner. The pattern for the grooves 41b is exposed. Thereafter, the photoresist film is developed to remove the exposed portions, and the glass plate is etched to form groove regions corresponding to the grooves 41b. Note that the etching time is changed to change the depth of the groove. In addition, the order of exposure may be reversed. After the photoresist film is removed, an original disk with a land/groove pattern is obtained. Next, based on the land/groove pattern on the surface of the original disk, the surface is plated (or electrotyped), and a substrate with a land/groove pattern is generated and separated from the original disk. It is preferable that the groove depth (or the height of the land 41a) in the land/groove pattern of the substrate 41 be in the range of 80 to 800 nm. The range of 100 to 600 nm is further preferable.

In addition, the aforementioned original disk is plated to generate a second original plate, and by using the second original disk, plating is performed, whereby a substrate with a reversed land/groove pattern may be generated. Furthermore, by plating the second original disk or hardening a resin solution applied to the second original, a third original plate is generated, and the third original disk is plated, whereby a substrate with a land/groove pattern may be formed.

As mentioned previously, the formation of the magnetic layer 42 is performed by forming a thin layer of magnetic material with vacuum film forming means, such as vacuum evaporation, sputtering, ion plating, etc., a plating method, etc. The magnetic material of the magnetic layer 42 is able to employ cobalt (Co), alloys with Co (CoNi, CoNiZr, CoNbTaZr, etc.), iron (Fe), alloys with Fe (FeCo, FeCoNi, FeNiMo, FeAlSi, FeAl, FeTaN, etc.), Ni, and alloys with Ni (NiFe, etc.). Particularly, FeCo and FeCoNi are preferable. It is preferable that the thickness of the magnetic layer 42 be in the range of 50 to 500 nm. The range of 100 to 400 nm is further preferred.

A magnetic transfer method according to a third embodiment of the present invention will hereinafter be described in detail. Initially, a description will be given of a master carrier, which is employed for magnetic transfer, and a magnetic recording medium, which is a slave medium to which predetermined information is transferred magnetically from the master carrier.

Figure 6:
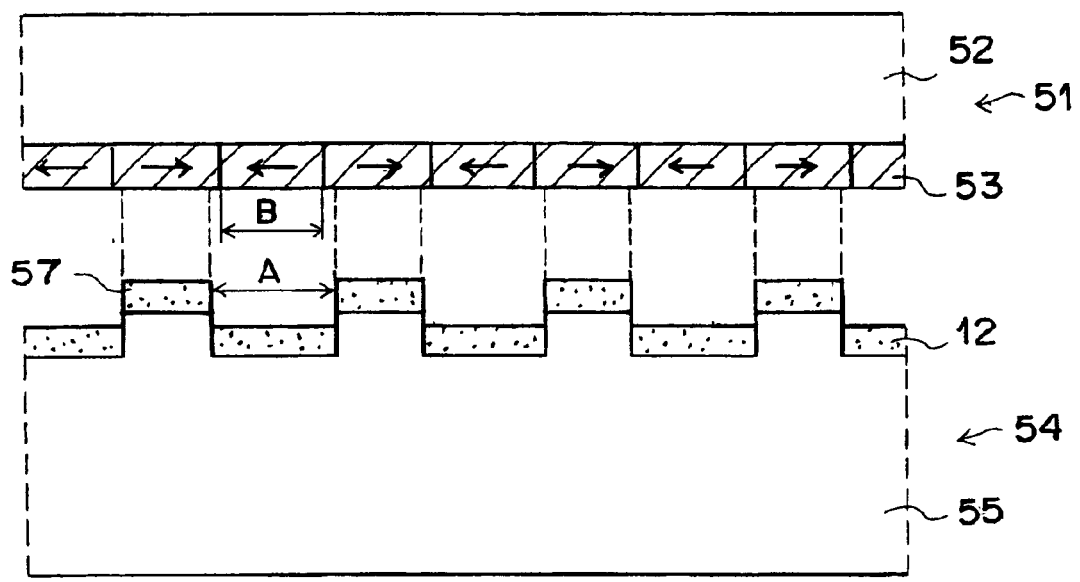
FIG. 6 is a sectional view showing a master carrier and a magnetic recording medium.

FIG. 6 shows the cross section of a magnetic recording medium 51 and a master carrier 54. The magnetic recording medium 51 is a magnetic disk for longitudinal recording and has a magnetic layer (recording-reproducing layer) 53 on a base 52. In FIG. 6, the recording-reproducing layer 53 is provided on only one side of the base 52. However, recording-reproducing layers may be provided on both sides of the base 52, respectively. Note that the base 52 may be a hard substrate or flexible substrate.

The master carrier 54 is formed into a disk shape and equipped with a substrate 55 and a soft magnetic layer 56. The surface of the substrate 55 has a land pattern corresponding to information (e.g., a servo signal) that is to be transferred to the recording-reproducing layer 53 of the magnetic recording medium 51. The soft magnetic layer 56 is formed on the land pattern of the substrate 55. As a result, the master carrier 54 is equipped with a pattern that consists of a plurality of lands 57 having magnetic layers on the land surfaces. Note that the master carrier 54 is not limited to the structure of the third embodiment. The soft magnetic layer may be formed on only the lands of the land pattern, or buried in only the grooves. In addition, in the case where the substrate is composed of a ferromagnetic material such as Ni, it does not always need to be coated with a soft magnetic material. The land pattern provided on the substrate surface is equivalent to the "pattern that consists of a plurality of lands having magnetic layers on the land surfaces." Furthermore, lands consisting of soft magnetic layers may be formed in pattern form on a flat substrate.

In addition, if the uppermost layer of the master carrier is coated with a protective film such as a diamond-like carbon (DLC) film, it is preferable because contact reliability is enhanced by the protective film and therefore magnetic transfer can be performed a great number of times. Furthermore, a Si film may be formed under the DLC protective film by sputtering, etc.

The pattern consisting of a plurality of lands having magnetic layers on the land surfaces, which is determined from the land pattern of the substrate and the thickness of the magnetic layer, is determined in consideration of the influence of a demagnetizing field during magnetic transfer, with respect to a magnetization pattern which is transferred to the magnetic layer of the magnetic recording medium by magnetic transfer. That is, the land pattern is determined so that the magnetization pattern becomes a desired pattern. More specifically, the land pattern on the master carrier is formed so that it is not 1:1 with respect to a desired magnetization pattern that is transferred to the magnetic layer of the magnetic recording medium.

More specifically, a magnetic recording medium, which is a slave medium to which magnetic transfer is performed, the components of a master carrier, and a pattern to be transferred, are determined. Then, transfer quality (e.g., a reproduced signal) is confirmed by a combination of these. Based on the transfer quality, the pattern that is provided on the master carrier is corrected.

For example, suppose that as shown in FIG. 6, a desired magnetization pattern to be transferred to the magnetic layer 53 of the magnetic recording medium 51 is a pattern in which magnetization directions are reversed at regular intervals. When magnetic transfer is performed, a transfer field is applied with the magnetic layer 53 of the magnetic recording medium 51 and the magnetic layer 56 of the master carrier 54 held in direct contact with each other or in close proximity, as described later. A small region in the magnetic layer 53 of the magnetic recording medium 51 corresponding to the region between the lands 57 of the master carrier 54 becomes a magnetization transition region. Therefore, in the pattern on the magnetic recording medium 51 after transfer, if the width B of the region of the magnetic recording medium 51 corresponding to the groove between the lands on the master carrier 54 becomes narrower than the width A of the groove by a demagnetizing field during application of a transfer field, then the master carrier 54 is equipped with a pattern in which the land is narrowed so that the width A becomes wider than the width B.

The demagnetizing field needs to be determined by the aforementioned recursive method, because it relates to all elements, which are employed in performing magnetic transfer, such as the slave medium (particularly, the thickness and magnetic characteristic of the magnetic layer), the pattern shape on the master carrier, the minimum dimension of the land, etc.

The magnetic transfer is performed with the recording-reproducing layer 53 of the magnetic recording medium 51 and the soft magnetic layer 6 of the master carrier 54 held in direct contact with each other or in close proximity.

Figure 7A:
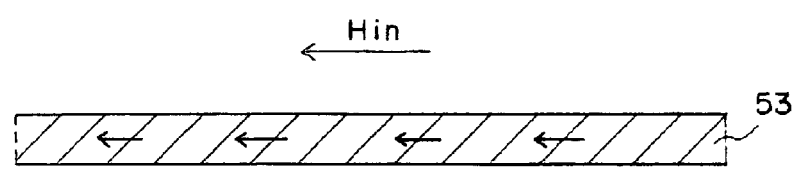
FIGS. 7A to 7C are diagrams showing the basic steps of a magnetic transfer method of the present invention.
Figure 7B:
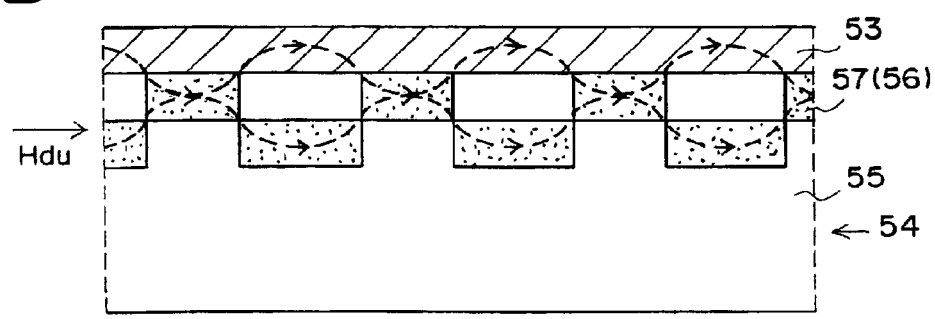
Figure 7C:
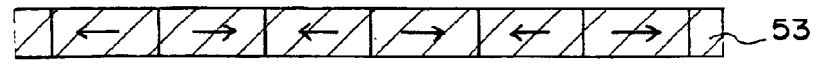

FIG. 7 shows the basic steps of the magnetic transfer. FIG. 7A shows the step of initializing the magnetic recording medium, FIG. 7B the step of bringing the master carrier and the magnetic recording medium into direct contact with each other and then applying a transfer field $H_{du}$, and FIG. 7C the magnetization of the magnetic recording medium obtained after magnetic transfer. Note in the figures that for the magnetic recording medium 51, only the recording-reproducing layer 53 is shown.

As shown in FIG. 7A, the recording-reproducing layer 53 is initialized by applying an initializing field $H_{in}$ in one direction (longitudinal direction of a data track on the magnetic recording medium 51).

Thereafter, as shown in FIG. 7B, the initialized recording-reproducing layer 53 of the magnetic recording medium 51, and an information carrying surface consisting of a soft magnetic layer 56 coated on a land pattern on the substrate 51 of a master carrier 54, are held in close proximity to each other (in the figure, in intimate contact with each other), and a transfer field H$du$ is applied in the opposite direction from the direction of the initializing field $H_{in}$ to perform magnetic transfer. Consequently, magnetization reversal takes place at the small regions of the recording-reproducing layer 53 corresponding to the groove regions between the lands in the land pattern of the master carrier 54. As shown in FIG. 7C, the information (e.g., a servo signal) carried by the master carrier 54 is magnetically transferred and recorded on the recording-reproducing layer 53 of the magnetic recording medium 51.

Note that it is necessary that the initializing field $H_{in}$ and the transfer field $H_{du}$ employ values determined in consideration of the coercive field of the slave medium and the relative magnetic permeabilities of the master carrier and the slave medium.

If magnetic transfer is performed in the aforementioned manner by utilizing the master carrier of the present invention having a pattern formed in consideration of demagnetizing-field correction, a desired magnetization pattern can be accurately transferred to a magnetic recording medium. Particularly, in the case where this information is a servo signal, tracking servo performance is enhanced.

Finally, while the present invention has been described with reference to the preferred embodiments thereof, the invention is not to be limited to the details given herein, but may be modified within the scope of the invention hereinafter claimed.

What is claimed is:

1. A master carrier for magnetic transfer, comprising:

a substrate with a land/groove pattern, formed from a magnetic material, which corresponds to information to be transferred;

wherein each of approximately rectangular lands in said land/groove pattern has four round corners whose radius is from 1% through 47% of the width of a data track.

2. The master carrier as set forth in claim 1, wherein said substrate has nickel as its main component.

3. The master carrier as set forth in claim 1, wherein said magnetic material covering the surface of the land/groove pattern of said substrate is a soft magnetic material whose coercive field is 48 kA/m (≈600 Oe) or less.

4. A magnetic transfer method comprising the steps of:

applying an initializing field to a master carrier comprising a substrate with a land/groove pattern, which is formed from a magnetic material and corresponds to information to be transferred, and in which each of approximately rectangular lands in said land/groove pattern has four round corners whose radius is from 1% through 47% of the width of a data track;

bringing said master carrier into direct contact with a slave medium having a magnetic recording portion; and transferring a magnetization pattern corresponding to said land/groove pattern to said slave medium by applying a transfer field to said master carrier being held in direct contact with said slave medium.

* * * * *